United States Patent [19]
Schlichting et al.

[11] Patent Number: 4,620,089
[45] Date of Patent: Oct. 28, 1986

[54] AUTOMATIC OPTICAL FOCUSING DEVICE

[75] Inventors: Johannes Schlichting; Kerstin Halwass, both of Jena, German Democratic Rep.

[73] Assignee: Jenoptik Jena G.m.b.H., Jena, German Democratic Rep.

[21] Appl. No.: 721,254

[22] Filed: Apr. 8, 1985

[30] Foreign Application Priority Data

May 2, 1984 [DD] German Democratic Rep. ... 262570

[51] Int. Cl.⁴ .......................... H01J 40/14; G01J 1/20
[52] U.S. Cl. ................................... 250/201; 250/216; 250/234; 350/3.6
[58] Field of Search ............... 250/200, 201, 550, 216, 250/578, 234, 257 R; 350/3.6, 3.7, 3.8, 3.66, 3.72, 3.73

[56] References Cited
U.S. PATENT DOCUMENTS 4,097,730  6/1978  Korpel .................. 250/201

*Primary Examiner*—Eugene R. LaRoche
*Assistant Examiner*—D. C. Mis

[57] ABSTRACT

An auto-focus system for focusing reflecting objects which are under investigation in a measuring device. The invention comprises a light source for producing an illumination beam for illuminating an object plane of an objective lens to be focused, an imaging beam and a focusing beam, both originating from the illuminated object, means for separating the focusing beam and the imaging beam, the latter producing an image of the object in an image plane which is evaluated, and an amplitude object not visible in the imaging beam. Means are provided to render visible the amplitude object in two detector planes, where resulting counter moving interference patterns are evaluated and used for focusing the objective lens.

5 Claims, 3 Drawing Figures

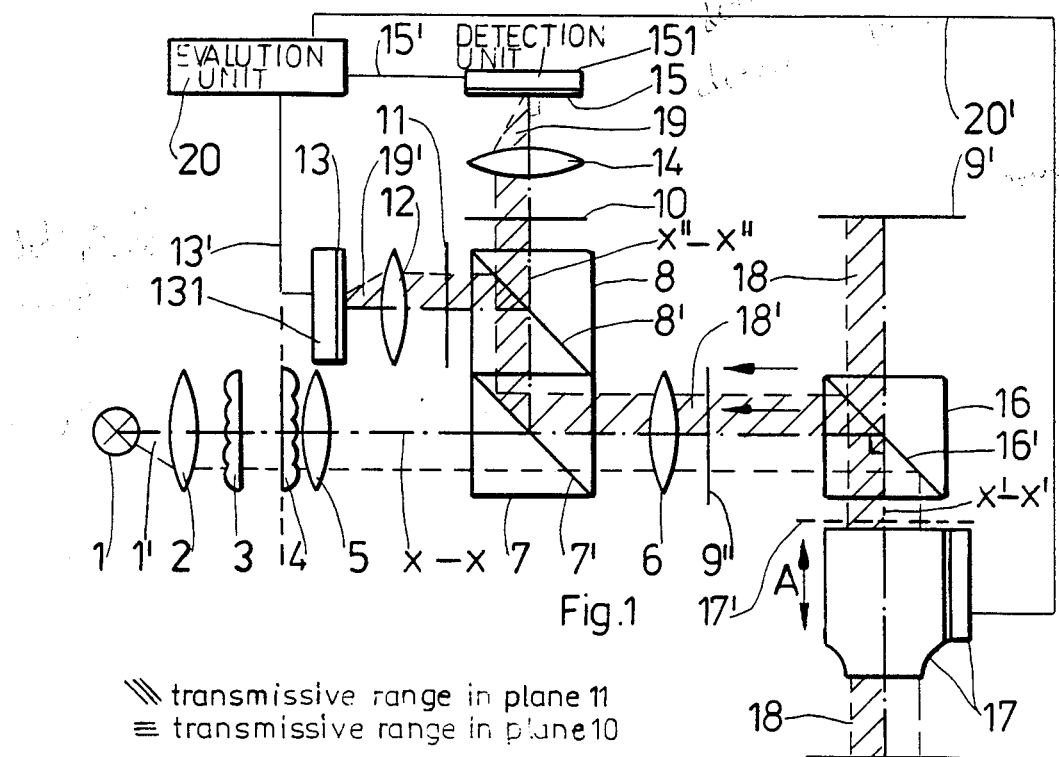
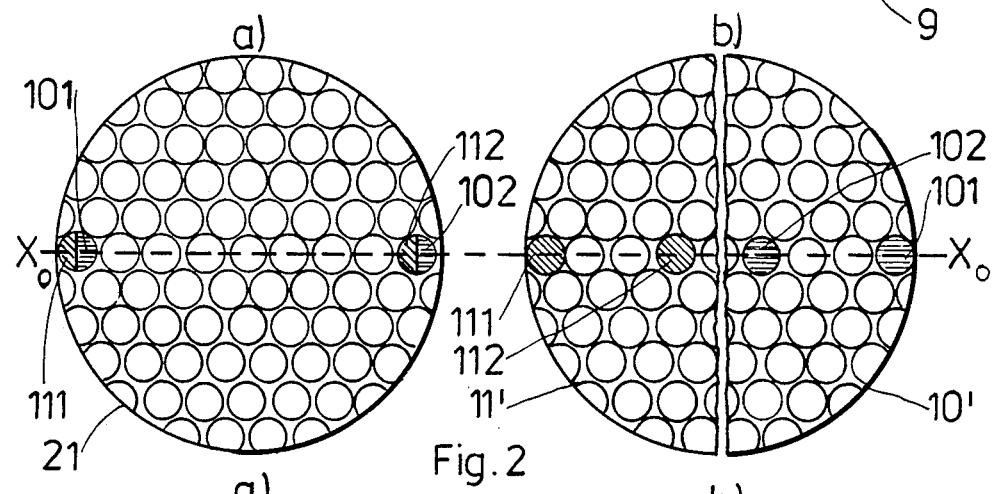
⧸⧸⧸ transmissive range in plane 11
≡ transmissive range in plane 10
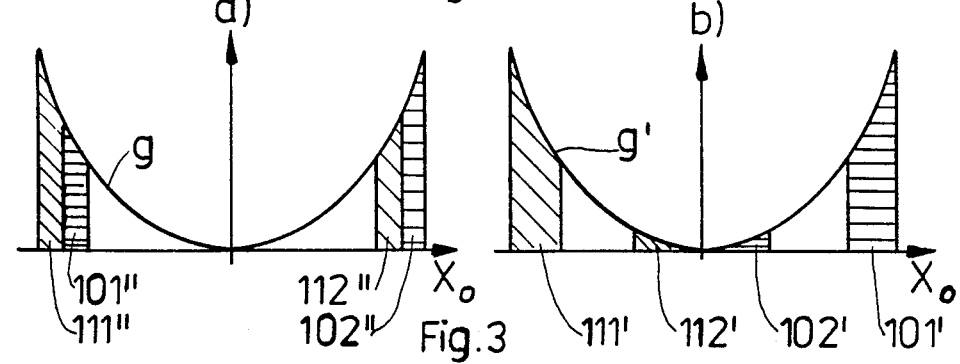

AUTOMATIC OPTICAL FOCUSING DEVICE

The invention relates to an automatic optical focusing device particularly for positioning of reflecting objects in photolithographic and precision measuring devices. Technical solutions which operate in reflected light within as well as externally of the proper imaging path of beam are known.

The latter are restricted to comparatively great back focal lengths.

In those cases in which the image signal itself is not exploited or cannot be exploited for focusing, for example, when the focusing has to be performed without an object under treatment in the object field, a spectral range different from the imaging radiation is utilized for focusing to separate interfering light from the imaging radiation by spectral separation. In this case images of test objects are, for example, employed for focusing. In those devices where the focusing is performed inherent in the imaging path of rays the sharpness of the focused image is usually evaluated. The devices according to the prior art are disadvantageous since the utilization of different spectral ranges renders an optical system complicated and requires the use of selective beam splitters and additional color filters. The evaluation of the sharpness of the focused image or of other criteria of intensity requires mechanical oscillations for determining the extreme value for the criterion in the depth.

It is an object of the present invention to obviate the above disadvantages.

It is a further object of the present invention to provide an automatic focusing device which operates simultaneously and at the same wavelength as an imaging path of rays. These and other objects are realized in an automatic focusing device, in which a virtual amplitude object is used for focusing which is invisible in the imaging path of rays and is rendered visible in the focusing path of rays by inserting apertures in the plane of the pupil, the optical imaging system being operated in autocollimation. The amplitude object is produced by a suitable phase object in the illumination path of rays and is rendered visible by a contrasting procedure. Suitable amplitude objects are gratings or combination of gratings holographically produced by gratings. The images can be evaluated depending on the path of rays by sharpness, image size, and/or image drift. The kind of illumination has to be optimized specifically as concerns energy and contrast, a partially coherent illumination being a reasonable compromise. In a prefered embodiment a fly's eye condenser lens is used for illumination.

By insertion of the apertures in the pupil plane the interference of at least two fly's eye condenser lenses which are spatially coherent to one another can be directly used to produce sinus gratings as an amplitude object. To eliminate mechanical oscillations otherwise required for evaluation as pseudo-shearing procedure is employed taking advantage of the finite extension of the radiation source with a partially coherent illumination. The diffraction image of a sinus grating contains the first order and the minus first order which appear in the pupil as images of the illumination source with a suitable illumination. This is given with a fly's eye condenser lens by the arrangement of the individual fly's eyes. These images of the light sources are split by beam splitting and by decentered reverse sense local frequency filters or pupil division, and the respective coherent portions are brought to interfere at different locations. When out-of-focus the sinus gratings exhibit different phase positions, the signs and amount of which characterize the defocusing uniquely. In the aberration free and focused state the phase difference between two sinus gratings becomes zero, when there is a residual aberration the focusing must be calibrated. The evaluation can be performed by a suitable sensor, for example, a CCD-sensor line. The phase measurement is electronically detected. In order to minimize interfering influences the evaluation is limited to one or only a few local frequencies. The described procedure can be used independent of the employment of a virtual amplitude object. When dimensioning the light source a compromise is necessary between the sensitivity and the operation range of the focusing, wherein the accuracy of the phase measurement has a decisive influence. Monochromatic light of sufficient spatial incoherence can be produced with a gas laser with a rotating diffusing disc which, in turn, serves as a secondary light source at the entrance of a fly's eye condenser lens. The focusing signal is used as an input of a control circuit for focusing which is realised via mechanical displacements.

In order that the invention may be more readily understood reference is made to the accompanying drawings which illustrate diagrammatically and by way of example one embodiment thereof and where FIG. 1 shows a schematic view of an auto-focus arrangement according to the invention, FIGS. 2a, b are schematic views of an exit pupil after insertion of an aperture in the focusing beam of the auto-focus arrangement of FIG. 1, FIGS. 3a, b are graphs illustrating the wave aberration course in the exit pupil of FIGS. 2a, b at an intentionally performed defocusing.

In FIG. 1, a light source 1 emits an illumination beam 1' (only one half shown) along an optical axis x—x about which a collective lens 2, a fly's eye condenser lens composition 3 and 4 and a lens 5 are arranged one after another. The lens 5 is followed by a first beam splitter 7 having a beam splitting face 7' inclined to the optical axis x—x by about 45°. A further lens 6 is followed by a second beam splitter 16 which folds the optical axis x—x at right angles to itself, the folded axis portion is designated x'—x'.

The beam splitter 16 has a beam splitting face 16' inclined by 45° relative to the axis x—x and x'—x', respectively.

About the axis x'—x' a projection lens 17 is located which is adjustable in directions indicated by the double arrow A by net visible means.

The lens 17 has an exit pupil 17', an object plane 9 and an image plane 9' the latter is located subsequently to the beam splitting face 16' in a transmitted portion of an imaging beam 18 which is produced in the object plane 9 by reflection and propagates in reverse direction to the illumination beam 1' along the axis x'—x'. The portion of the imaging beam 18 which is reflected at the splitting face 16' is designated with the reference number 18'. Beam portion 18' returns along the axis x—x to the beam splitting face 7' and is reflected at right angles to the axis x—x and defines an axis x"—x".

In the latter a beam splitter 8 is arranged, a beam splitting face 8' of which splits the beam 18" into a transmitted portion 19 and a reflected portion 19'. In the transmitted portion 19 an aperture 10' in an exit pupil 10 is disposed followed by an optical system 14 and a detection means 151 which has a detection plane 15. In the reflected portion 19' an aperture 11' is located in an exit pupil 11 followed by an optical system 12 and a detection means 131 including a detection plane 13. The detection means 131 and 151 are connected via lines 13' and 15', respectively, to an evaluation unit 20 which is connected via a line 20' to a focus adjustment means incorporated in the projection lens 17. The planes 9" and 10, 11, respectively, are optically conjugate to the object plane 9 and the exit pupil 17', respectively.

In operation, the light source 1 which is, for example, a laser emits the illumination light beam 1' along the optical axis x—x. The collective lens 2 fully illuminates the fly's eye condenser lens combination 3, 4 an image of which is produced by the lenses 5, 6 in the exit pupil 17' of the lens 17 after reflection at the splitting face 16' of the beam splitter 16. The object in the object plane 9, is, for example, a reflective sample, which is after reflection of the impinging illumination beam 1' and conversion into the reflected beam 18 imaged by the lens 17 through the beam splitting face 16' of the beam splitter 16 into the image plane 9' for evaluation by not shown means.

The portion of the reflected beam 18 which is reflected at the beam splitting face 16' is used for focusing the projection lens 17 and is therefore named focusing beam 18'. The latter is reflected at the beam splitting face 7' of the beam splitter 7. The transmitted portion is neglected. The reflected focusing beam 18' impinges upon the beam splitting face 8' of the beam splitter 8 which produces a reflected focusing beam 19' and a transmitted focusing beam 19. In the planes 10 and 11, respectively, apertures are arranged; an image thereof is shown in FIG. 2b. A combination of the two halves 10' and 11' of the apertures would yield a feasible aperture as inserted either in the plane 10 or in the plane 11. For sake of simplicity only the effective halves 10' and 11' are shown. The disc 10' is inserted into the plane 10 in the focusing beam 19. By virtue of the lens 14 two images of the fly's eye condenser lenses 3, 4 which consist of a plurality of lenses as shown on the discs 10', 11', namely, the lenses 101, 102, are superimposed in the detector plane 15, that is, the shadings of 101, 102 indicate that the beam portion 19 may pass to the detector plane 15, whereas the other lenses are blanked out (empty circles). In the detector plane 15 the images 101, 102, are superimposed to one another so that an interference pattern is produced. In analogy thereto, the reflected focusing beam 19' impinges upon the aperture 11' arranged in the plane 11. Again only one-half of the aperture disc 11' is shown. The openings 111 and 112 again are made prominent by shadings. Two individual lenses of the fly's eye condenser lens 3, 4 are superimposed through said openings 111, 112 in the detector plane 13 to interfere there by virtue of the refractivity of the lens 12. In the event the lens 17 is in focus the two interference patterns in the planes 13 and 15 are identical, so that the respective detector plane units 131 and 151 will feed respective signals to an evaluation unit 20 via the lines 13' and 15'. No central signal will result from a comparison to a comparator value, stored in the evaluation unit 20 which has been obtained from an initial calibration operation. In the event the lens 17 is out-of-focus, the resulting interference patterns are displaced mutually and a respective comparison will yield a control command via the line 20' to the adjustment means incorporated in said lens 17. The latter is displaced until a comparison of the interference patterns in 13 and 15 to the stored calibration value will yield indentity. The interference pattern in the plane 15 is, for example, scanned by a sensor line in the unit 151, the resulting signals are, both, indicative of the direction (double arrow A) and the amount of the defocusing. The resulting signals are fed into the evaluation unit 20 where the signals from the plane 13 which are detected in analogy to plane 15 are combinedly compared to the comparator values. In the event, the lens 17 is out-of-focus a control signal is fed into the adjustment means in the lens 17 until focusing is obtained. The calibration of the focused state can be obtained by any suitable means. It is feasible to provide observation means, either in the detector planes 13, 15 or in the image plane 9'. It is also feasible to calibrate the device by optoelectronic means. The invention is not restricted to the above embodiment. The aperture as shown in FIG. 2b can be modified to yield an image as shown in FIG. 2a. The aperture 21 is inserted in both planes 10 and 11, with the exception that the half-openings 101, 102 are effective in the plane 15 and the half-openings 111, 112 are effective in the plane 13.

Furthermore, the splitting cube 8 can be substituted by a reflector inserted inclinedly only into and extending over one half of the focusing beam 18' so that the focusing beam portion 19 will propagate past the reflector and the focusing beam portion 19' will be reflected by the reflector. The subsequent components are the same as in FIG. 1. In FIGS. 3a, b the course of the wave aberration in the planes 10 and 11, respectively, are shown which are optically equivalent to the exit pupil 1' of the lens 17.

An intentional out-of-focus position of the lens 17 is assumed. The x-axis represents a section through the apertures indicated by the axis $x_o$—$x_o$ in FIGS. 2a, b. The ranges which are associated to the openings 101, 102, and 111, 112, respectively, are provided with like shadings, namely 101', 102', 111', 112' in FIG. 2b and 111", 101", 112", 102" in FIG. 2a. The curves g and g', respectively, represent a phase curve at an intentional defocusing of the lens 17. The associated ranges for example, 101', 102' and 112', 111' in FIG. 2b demonstrate a phase difference which is oppositely directed in the associated detector planes 15 and 13 (FIG. 1), respectively, and which result in a mutual displacement of the resulting interference pattern in the detector planes 13 and 15 (FIG. 1). The residual square portion of the wave aberration course beyond the transmissive range involves a reduction of the modulation, that is, of the distinctness of the interference pattern.

We claim:

1. An auto-focusing device, particularly for positioning reflective objects under investigation
   in a measuring apparatus,
   comprising about an optical axis in mutual optical alignment,
   a light source for emitting a narrow spectral band radiation,
   means for producing a plurality of images of said light source,
   said plurality of images serving as an illumination beam,
   a first and a second lens,
   a first beam splitter being for folding said optical axis at right angles to itself,
   an objective lens being arranged subsequently to said beam splitter in the folded optical axis,
   said objective lens having an object plane and an image plane, said first beam splitter having a beam splitting face inclinedly arranged by 45° relative to said optical axis and to said folded optical axis, said first and said second lens being for directing said illumination beams for illuminating said object plane via said first beam splitter and said object lens, a reflective object to be measured, said reflective object being for producing a focusing beam and an imaging beam, said objective lens being for imaging said reflective object into said image plane for evaluation, said beam splitting face being for transmitting said imaging beam and for reflecting said focusing beam to propagate in opposite direction to said illumination beam, a deviating means being inserted into said focusing beam between said second and said first lens, said deviating means being for directing said focusing beam at right angles to said optical axis, means for producing a first beam portion and a second beam portion, from said focusing beam, said means for producing said first and said second beam portion being arranged subsequently to said deviating means in said focusing beam, a first aperture being arranged in said first beam portion, a second aperture being arranged in said second beam portion, a first detector unit, a second detector unit, said first aperture being for producing two first individual images from said plurality of images transfered by said first beam portion, first means for producing a first interference pattern by superimposing said two individual images in said first detector unit, said second aperture being for producing two second individual images from said plurality of images transfered by said second beam portion, second means for producing a second interference pattern by superimposing said two second individual images in said second detector unit, an evaluation unit being connected to said first and said second detector unit, on the one hand, and to an adjustment means, on the other hand, incorporated in said objective lens for performing adjustment movements of the latter along said folded optical axis, said first detector unit and said second detector unit being for producing signals indicative of an actual focus position of said objective lens, and of the direction of defocusing, if any, said signals being compared to a focused position value stored in said evaluation unit, said evaluation unit being for feeding an adjustment signal to said adjustment means when said objective lens being out-of-focus.

2. An auto-focus device as claimed in claim 1, wherein said means for producing a plurality of images is a fly's eye condenser lens.

3. An auto-focus device as claimed in claim 2, wherein said first and said second detector unit include each a CCD-line in operative connection to the respective interference pattern planes.

4. An auto-focus device as claimed in claim 1, wherein the means for producing said first beam portion and said second beam portion is a second beam splitter including a beam splitting face which transmits said first beam portion and reflects said second beam portion.

5. An auto-focus device as claimed in claim 1, wherein said means for producing said first beam portion and said second beam portion is a reflector which is inclinedly and partially inserted into said focusing beam to reflect said one beam portion, said second beam portion being unaffected by said reflector.

* * * * *